(12) United States Patent
Hsu

(10) Patent No.: US 9,329,635 B2
(45) Date of Patent: May 3, 2016

(54) READILY DETACHABLE PANEL DEVICE

(71) Applicant: Wistron Corporation, New Taipei (TW)

(72) Inventor: Shih-Min Hsu, New Taipei (TW)

(73) Assignee: Wistron Corporation, New Taipei (TW)

(*) Notice: Subject to any disclaimer, the term of this patent is extended or adjusted under 35 U.S.C. 154(b) by 317 days.

(21) Appl. No.: 14/092,917

(22) Filed: Nov. 27, 2013

(65) Prior Publication Data

US 2014/0376198 A1 Dec. 25, 2014

(30) Foreign Application Priority Data

Jun. 21, 2013 (TW) ............... 102122215 A

(51) Int. Cl.
G06F 1/16 (2006.01)

(52) U.S. Cl.
CPC ............ *G06F 1/1637* (2013.01); *G06F 1/1626* (2013.01)

(58) Field of Classification Search
USPC ........ 345/173; 361/679.21; 29/592.1; 349/58
See application file for complete search history.

(56) References Cited

U.S. PATENT DOCUMENTS

| | | | | |
|---|---|---|---|---|
| 2002/0060758 A1* | 5/2002 | Jeong | ................... | G02B 6/0068 349/65 |
| 2007/0218957 A1* | 9/2007 | Nishikawa | ............... | G06F 3/045 455/566 |
| 2007/0236465 A1* | 10/2007 | Chou | ................... | G06F 1/1601 345/173 |
| 2009/0295741 A1* | 12/2009 | Cheng | ...................... | H05K 5/02 345/173 |
| 2010/0259873 A1* | 10/2010 | Lee | ...................... | H04M 1/0266 361/679.01 |
| 2011/0001712 A1* | 1/2011 | Saito | ................... | G02F 1/13338 345/173 |
| 2011/0126989 A1* | 6/2011 | Farah | ................ | G02F 1/133308 156/701 |
| 2011/0134385 A1* | 6/2011 | Farah | ................ | G02F 1/133308 349/187 |

FOREIGN PATENT DOCUMENTS

| | | |
|---|---|---|
| TW | M295874 | 8/2006 |
| TW | I358143 | 2/2012 |
| TW | 201227641 | 7/2012 |

* cited by examiner

*Primary Examiner* — Adrian S Wilson
(74) *Attorney, Agent, or Firm* — Jianq Chyun IP Office

(57) ABSTRACT

A panel device including a first panel, a second panel, a frame, and a binder is provided. The frame has a wrenchable structure. The first panel is between the second panel and the frame. The binder adheres the second panel to the frame. The second panel can be detached from the frame through the wrenchable structure.

22 Claims, 11 Drawing Sheets

READILY DETACHABLE PANEL DEVICE

CROSS-REFERENCE TO RELATED APPLICATION

This application claims the priority benefit of Taiwan application serial no. 102122215, filed on Jun. 21, 2013. The entirety of the above-mentioned patent application is hereby incorporated by reference herein and made a part of this specification.

BACKGROUND OF THE DISCLOSURE

1. Field of the Disclosure

The present disclosure generally relates to a panel device, and more particularly, to a panel device in which a panel can be easily reworked.

2. Description of Related Art

Along with the development of display technology, our daily life is made very convenient. Flat panel display (FPD) has become today's mainstream display product thanks to its light weight and slim appearance. Moreover, the display panel of an electronic product is usually integrated with a touch control function in order to reduce the space required by the keyboard or operation buttons and to increase the size of the screen.

For example, if an electronic device offering both a display function and a touch control function is desired, a touch panel and a display panel can be adhered together with adhesive tape to form the desired electronic device.

When components of aforementioned electronic device need to be reworked, these components are usually separated. Conventionally, the touch panel is detached from the frame. However, because the touch panel is made of glass substrate, aforementioned reworking process may cause the glass substrate to break and accordingly the touch panel not to be reused. Thereby, difficulty in the rework of touch panel results in resource waste and cost increase.

SUMMARY OF THE DISCLOSURE

Accordingly, the present disclosure is directed to a panel device which allows a panel to be easily reworked.

The present disclosure provides a panel device including a first panel, a second panel, a frame, and a binder. The frame has a wrenchable structure. The first panel is between the second panel and the frame. The binder adheres the second panel to the frame. The second panel can be detached from the frame through the wrenchable structure.

According to an embodiment of the present disclosure, the frame has a first surface and a second surface opposite to each other, and the wrenchable structure includes a notch and a plurality of breakaway portions. The breakaway portions run through the first surface and the second surface of the frame. The notch is formed on the second surface of the frame.

According to an embodiment of the present disclosure, the frame has a plurality of sides, and each of the sides has a first gap and a connecting portion corresponding to the breakaway portion. The first gaps connect the breakaway portions, and the connecting portions shield a part of the second panel.

According to an embodiment of the present disclosure, the frame has a plurality of sides, and each of the sides has a second gap corresponding to the breakaway portion. Each of the second gaps runs through the corresponding side and exposes a part of the second panel.

According to an embodiment of the present disclosure, the frame is divided into a detachment area, an adhesion area, and a display area. The detachment area and the adhesion area are around the display area. The wrenchable structure is in the detachment area of the frame. The first panel is between the second panel and the display area of the frame. The binder is between the adhesion area of the frame and the second panel for adhering the second panel to the frame.

According to an embodiment of the present disclosure, the binder is adhered to the second panel corresponding to the detachment area and is covered by the wrenchable structure.

According to an embodiment of the present disclosure, the binder is adhered to the second panel corresponding to the detachment area and exposes a part of the second panel, and the exposed part of the second panel and the binder are covered by the wrenchable structure.

According to an embodiment of the present disclosure, the wrenchable structure covers the second panel corresponding to the detachment area.

According to an embodiment of the present disclosure, the first panel is a display panel.

According to an embodiment of the present disclosure, the second panel is a touch panel.

As described above, in the present disclosure, a wrenchable structure is designed on a frame, and the wrenchable structure is wrenchably connected to a second panel. Accordingly, during a rework process, the wrenchable structure can be first separated from the second panel to expose a part of the second panel, and then the partially exposed second panel can be easily detached from the frame.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
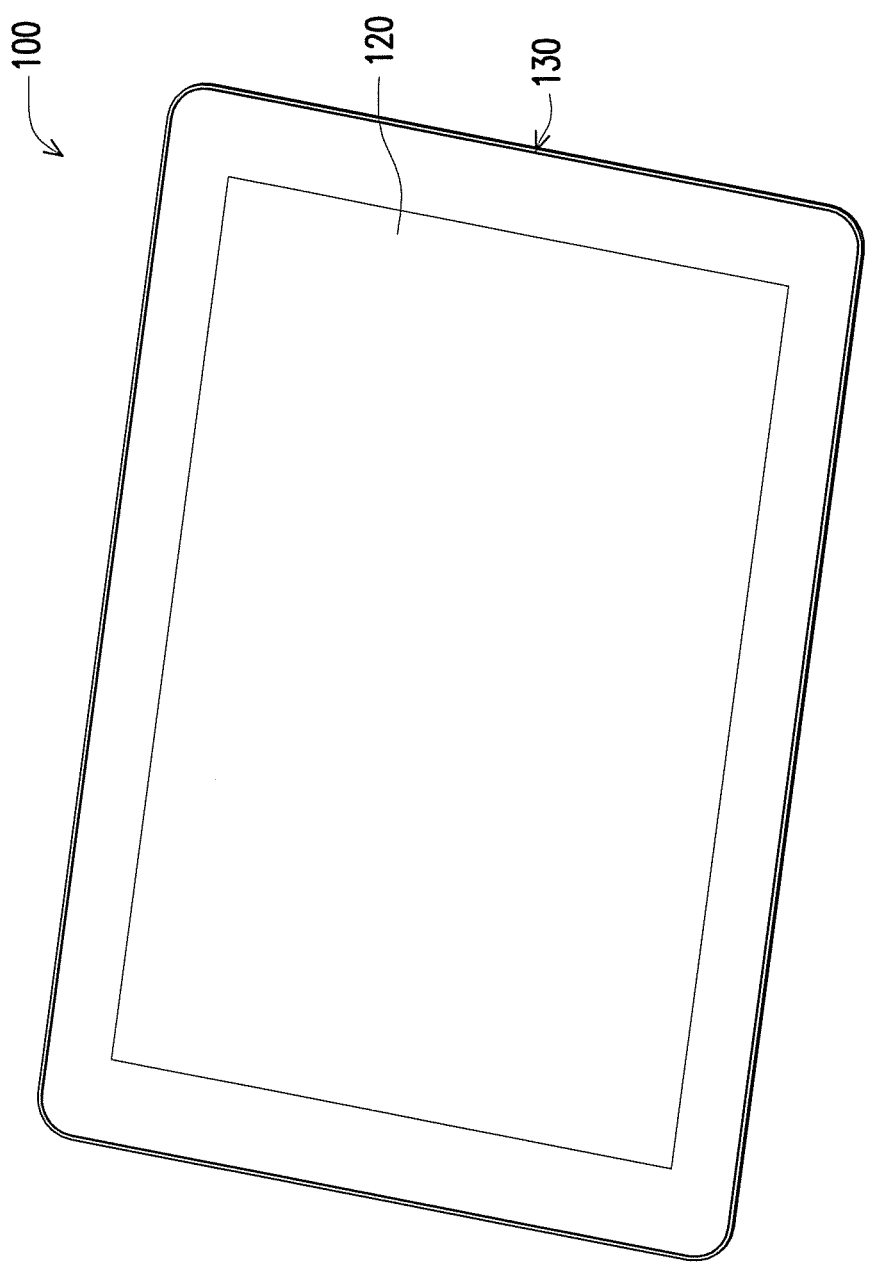
FIG. 1 is a diagram of a panel device according to a first embodiment of the present disclosure.
Figure 2:
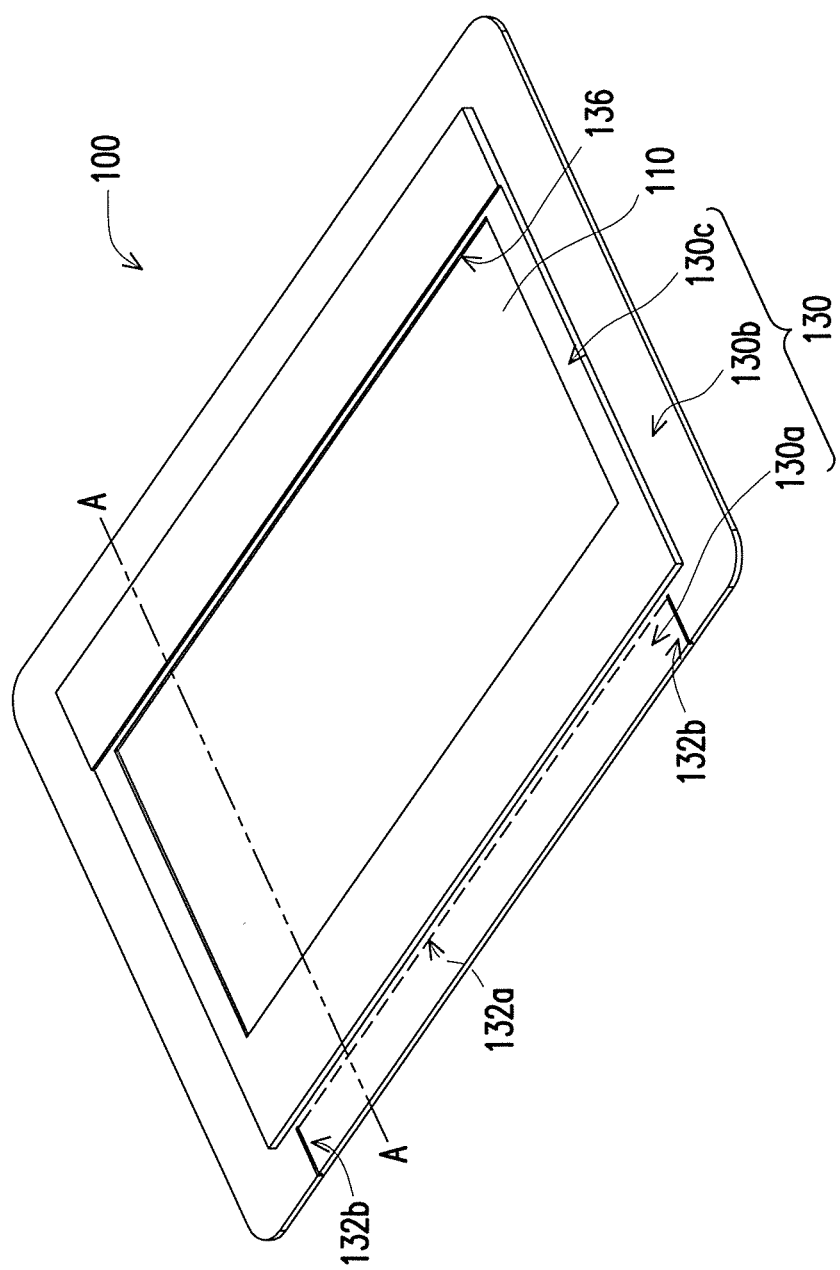
FIG. 2 is a diagram of the panel device in FIG. 1 from another viewpoint.
Figure 3:
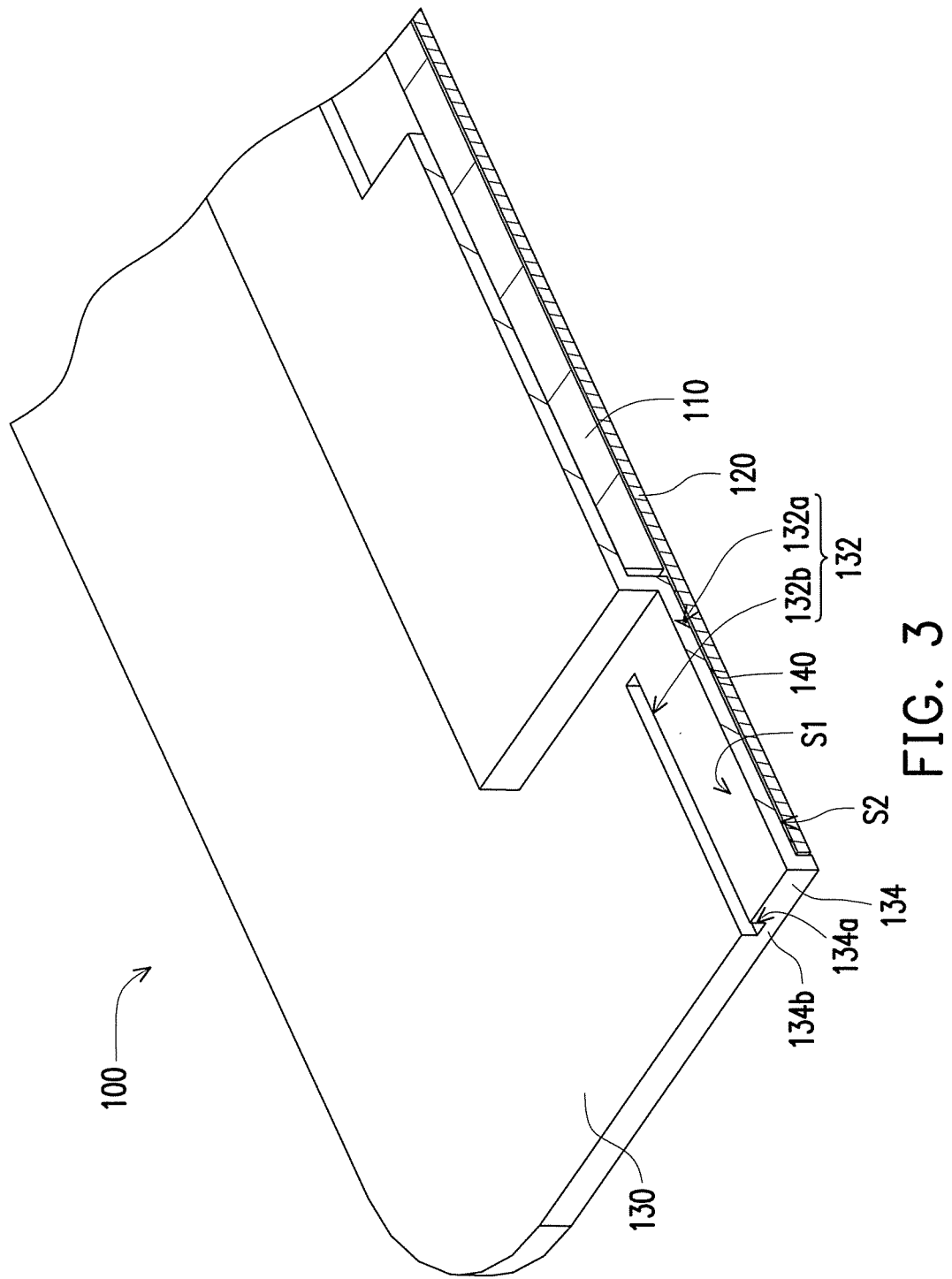
FIG. 3 is a diagram of the panel device in FIG. 2 along line A-A.

FIG. 1 is a diagram of a panel device according to a first embodiment of the present disclosure. FIG. 2 is a diagram of the panel device in FIG. 1 from another viewpoint. FIG. 3 is a diagram of the panel device in FIG. 2 along line A-A. Referring to FIG. 1 to FIG. 3, the panel device 100 in the present embodiment is a tablet computer or any other type of touch display device. The panel device 100 includes a first panel 110, a second panel 120, a frame 130, and a binder 140. The first panel 110 is a display panel, and the second panel 120 is a touch panel.

In the present embodiment, the frame 130 has a wrenchable structure 132. The first panel 110 is between the second panel 120 and the frame 130. A user can operate the panel device 100 in a touch control manner through the second panel 120. The binder 140 adheres the second panel 120 to the frame 130. The second panel 120 can be detached from the frame 130 through the wrenchable structure 132 to perform subsequent rework operation.

Figure 4:
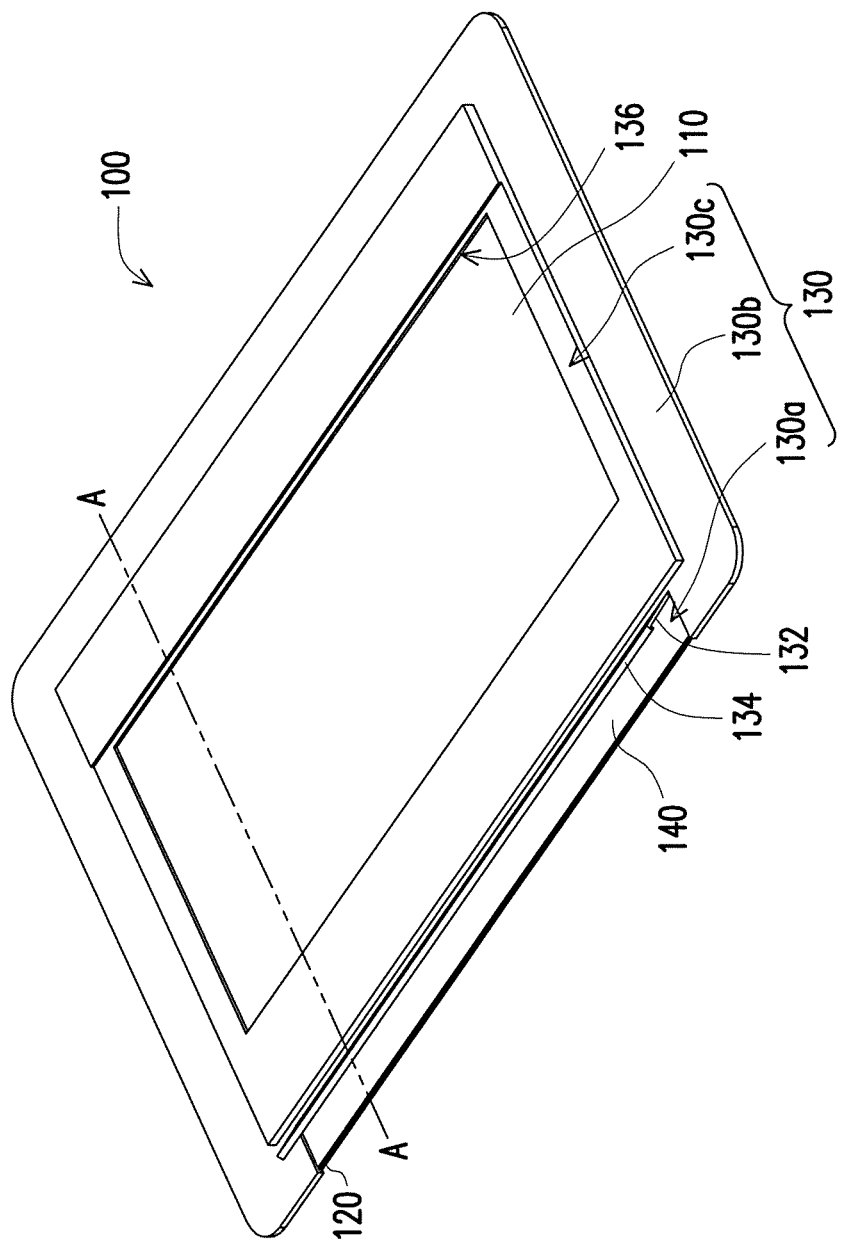
FIG. 4 is a diagram of the panel device in FIG. 2 when the panel device is reworked.
Figure 5:
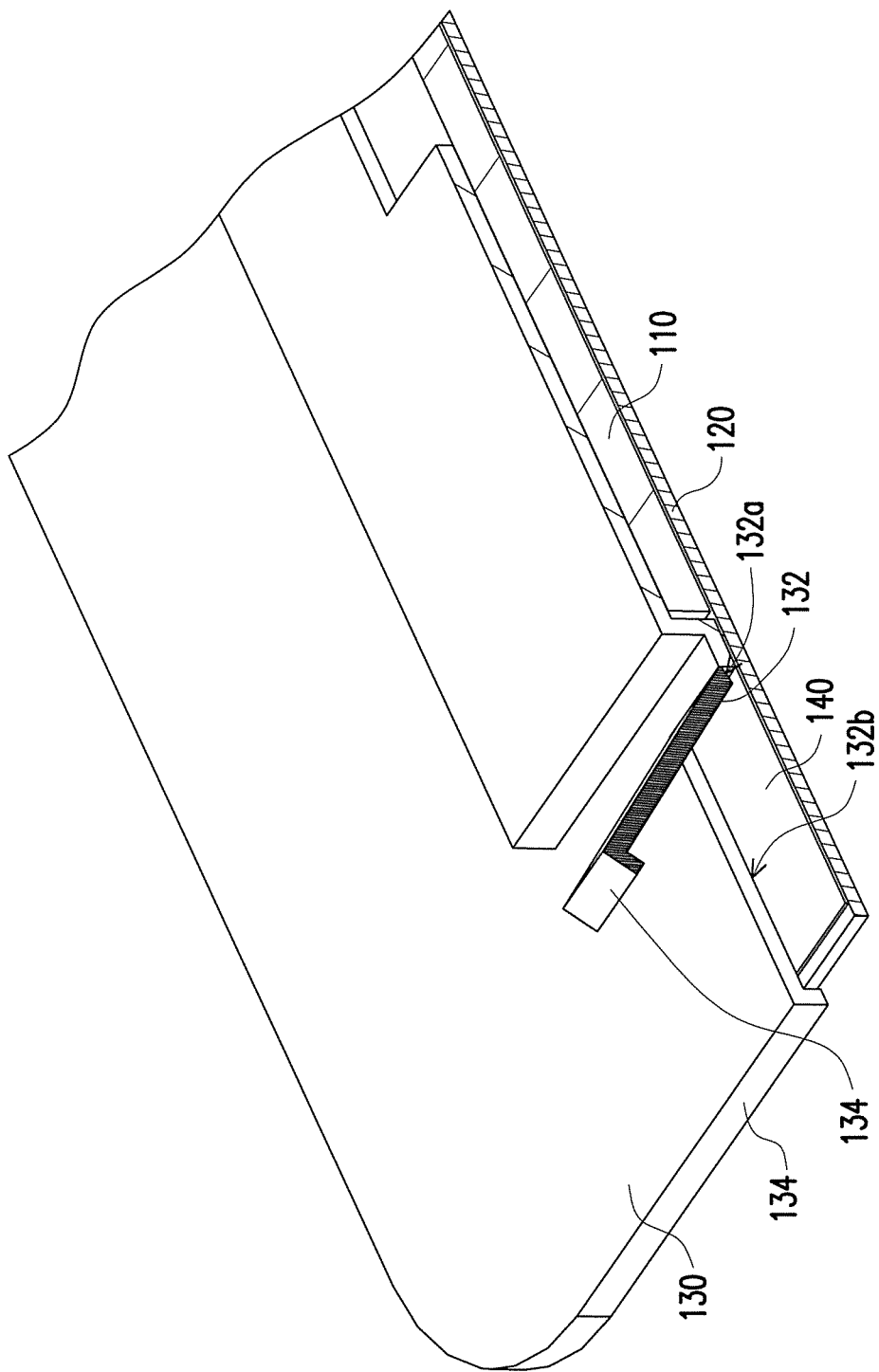
FIG. 5 is a diagram of the panel device in FIG. 4 along line A-A.

FIG. 4 is a diagram of the panel device in FIG. 2 when the panel device is reworked. FIG. 5 is a diagram of the panel device in FIG. 4 along line A-A. Referring to FIG. 4 to FIG. 5, in the present embodiment, the frame 130 is designed with aforementioned wrenchable structure 132, and the wrenchable structure 132 is wrenchable connected to the second panel 120.

To be specific, the frame 130 has a first surface S1 and a second surface S2 opposite to each other, and the wrenchable structure 132 includes a notch 132a and a plurality of breakaway portions 132b. The breakaway portions 132b are connected to the notch 132a and run through the first surface S1 and the second surface S2 of the frame 130. However, the present disclosure is not limited thereto, and in other embodiments, the breakaway portions may also be designed to run through the first surface of the frame but not the second surface of the frame. The notch 132a is formed on the second surface S2 of the frame 130. In the present embodiment, the notch 132a is formed at the bending portion of the wrenchable structure 132. The notch 132a is a partial indentation on the second surface S2 (i.e., the internal surface of the frame 130) of the frame 130. In other words, the notch 132a is not exposed on the first surface S1 (i.e., the external surface of the frame 130) of the frame 130, so that the panel device 100 can have an appealing appearance.

When the second panel 120 of the panel device 100 needs to be reworked, the wrenchable structure 132 is first separated from the second panel 120, where as shown in FIG. 4 and FIG. 5, part of the second panel 120 and the binder 140 are exposed. Then, the frame 130 is detached from the second panel 120, or the exposed part of the second panel 120 and the binder 140 are pushed away from the frame 130 with a finger or any other suitable tool. Accordingly, a user can easily release the relationship between the binder 140 and the frame 130 and the second panel 120, so that the second panel 120 can be easily detached from the frame 130. Besides, the possibility of the second panel 120 being damaged due to improper user operations during the detachment and rework process is reduced Additionally, as shown in FIG. 3, the frame 130 has a plurality of sides 134, and each of the sides 134 has a first gap 134a and a connecting portion 134b corresponding to the breakaway portion 132b. The first gaps 134a connect the breakaway portions 132b, and the connecting portions 134b shield a part of the second panel 120. Namely, partial indentations corresponding to the breakaway portions 132b are formed on the sides 134 as the first gaps 134a, as shown in FIG. 3. In the present embodiment, besides designing the breakaway portions 132b and the notch 132a to allow the second panel 120 to be easily detached from the frame 130, the breakaway portions 132b are further extended to the sides 134 of the frame 130 to form the first gaps 134a. Through the first gaps 134a, a user can easily separate the wrenchable structure 132 from the second panel 120. Besides, the connecting portions 134b shield a part of the second panel 120 to prevent the second panel 120 from being exposed, so that the panel device 100 can have an appealing appearance.

Figure 6:
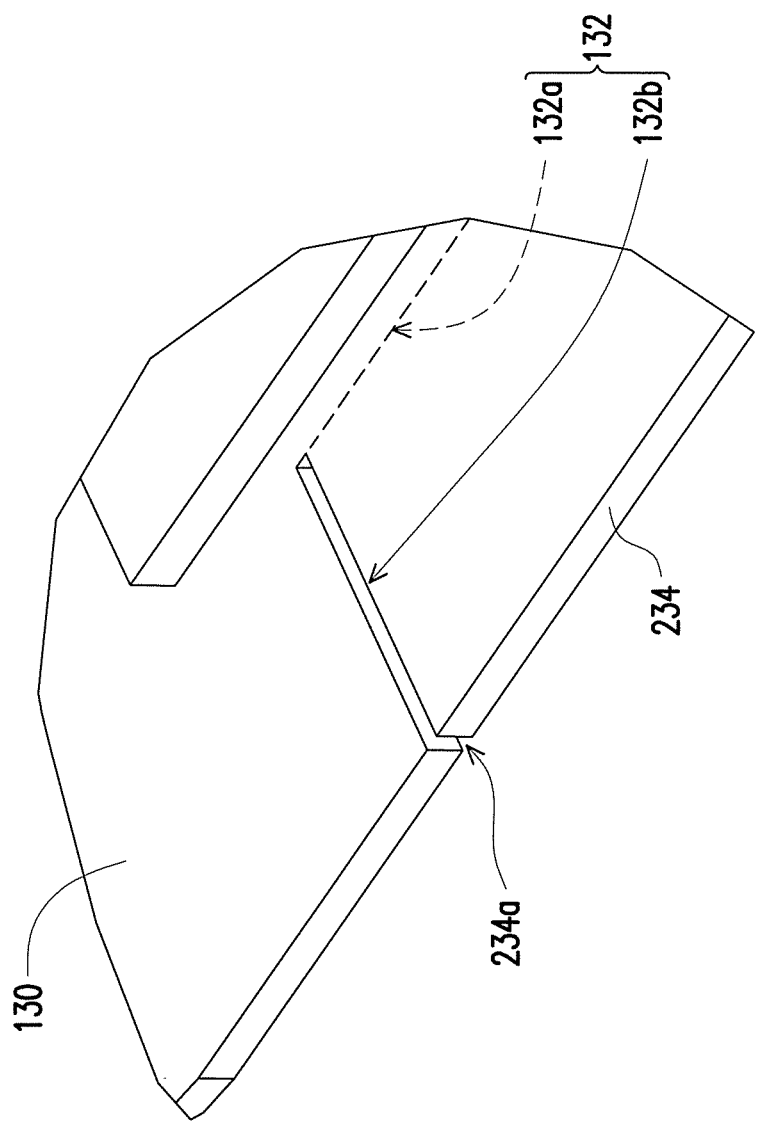
FIG. 6 is a diagram of a panel device according to a second embodiment of the present disclosure.

FIG. 6 is a diagram of a panel device according to a second embodiment of the present disclosure. Referring to FIG. 6, the main difference between the panel device 100 in FIG. 6 and the panel device 100 in the embodiment illustrated in FIGS. 1-5 is that in FIG. 6, each side 234 has a second gap 234a corresponding to the breakaway portion 132b. Unlike that shielding a part of the second panel 120 by using the connecting portions 134b (as shown in FIG. 3), in FIG. 6, each second gap 234a runs through the corresponding side 234 and exposes a part of the second panel 120. Accordingly, by extending the breakaway portions 132b to the sides 234 and breaking off the connections (i.e., the connecting portions 134b in FIG. 3), a user can easily separate the wrenchable structure 132 from the second panel 120.

In each embodiment described above, the frame 130 is divided into a detachment area 130a, an adhesion area 130b, and a display area 130c. The detachment area 130 and the adhesion area 130b are around the display area 130c. The wrenchable structure 132 is in the detachment area 130a of the frame 130. The first panel 110 is between the second panel 120 and the display area 130c of the frame 130.

The frame 130 has a display opening 136 in the display area 130c for exposing the first panel 110. The binder 140 is between the adhesion area 130b of the frame 130 and the second panel 120 for adhering the second panel 120 to the frame 130.

As shown in FIG. 4 and FIG. 5, in the present disclosure, the binder 140 not only adheres the second panel 120 to the frame 130 but also is disposed in the detachment area 130a. To be specific, the binder 140 is adhered on the second panel 120 corresponding to the detachment area 130a and is covered by the wrenchable structure 132. Accordingly, in the present disclosure, the binder 140 can fasten the wrenchable structure 132 so that the wrenchable structure 132 will not come off from the frame 130.

In the embodiments described above (illustrated in FIGS. 1-6), the binder 140 is adhered on the second panel 120 corresponding to the detachment area 130a for fastening the wrenchable structure 132. However, the disposition and position of the binder 140 is not limited in the present disclosure, and in other embodiments, the wrenchable structure 132 can be fastened on the second panel 120 through other techniques, which will be explained below with reference to embodiments.

Figure 7:
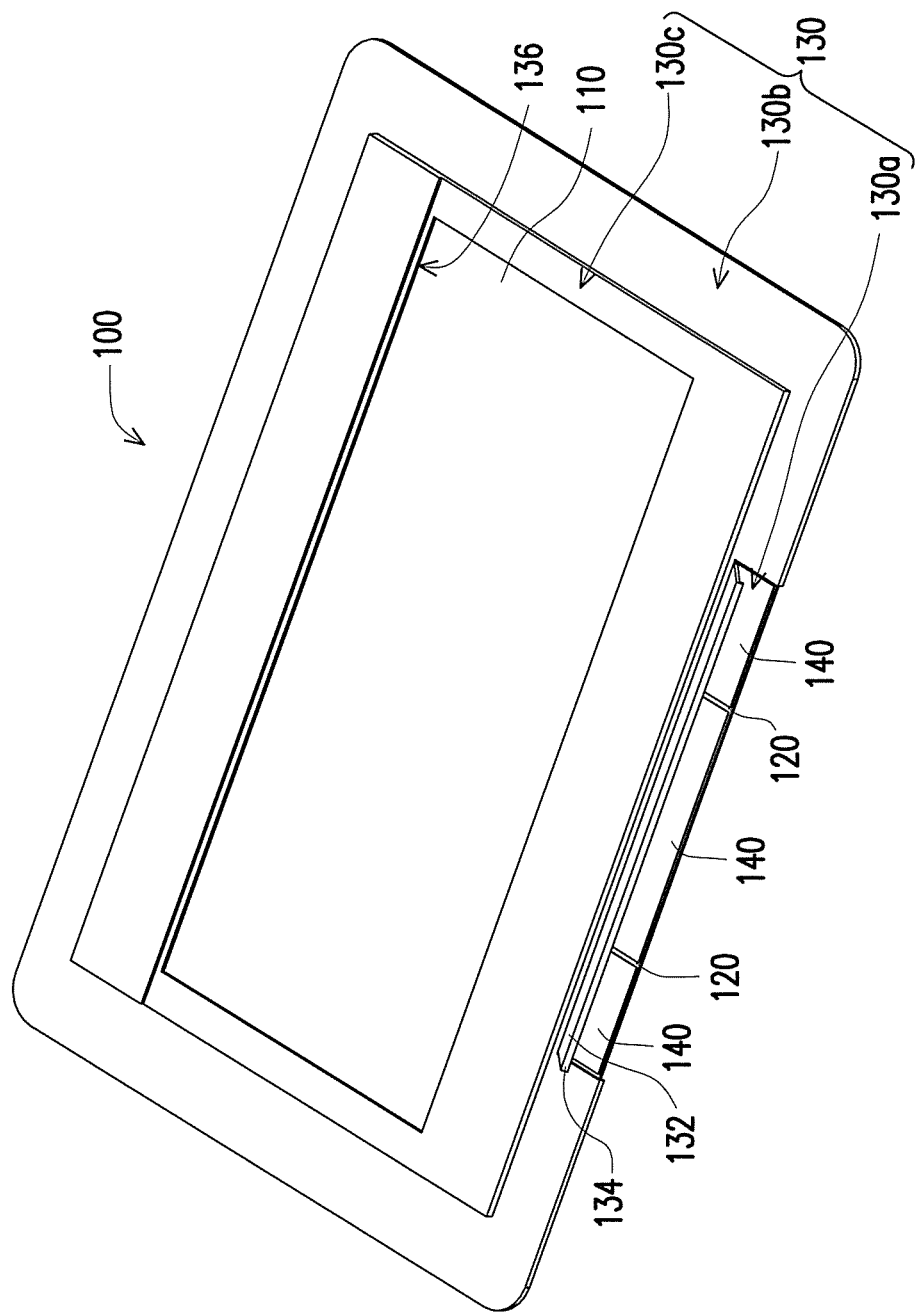
FIG. 7 is a diagram of a panel device according to a third embodiment of the present disclosure.

FIG. 7 is a diagram of a panel device according to a third embodiment of the present disclosure. Referring to FIG. 7, the main difference between the panel device 100 in FIG. 7 and the panel device 100 in foregoing embodiments illustrated in FIGS. 1-6 is that in FIG. 7, the binder 140 on the second panel 120 corresponding to the detachment area 130a is designed to have a partially disconnected structure. However, in the present embodiment, the adhesion area between the binder 140 and the second panel 120 is not limited, and it is within the scope of the disclosure as long as the binder is partially adhered on the second panel. To be specific, the binder 140 is adhered to the second panel 120 corresponding to the detachment area 130a and exposes a part of the second panel 120 (the part on the second panel 120 illustrated in FIG. 7), and both the exposed part of the second panel 120 and the binder 140 are covered by the wrenchable structure 132. Accordingly, the wrenchable structure 132 can still be fastened on the second panel 120 through the binder 140. In addition, because the binder 140 is only partially adhered on the wrenchable structure 132, when the second panel 120 of the panel device 100 needs to be reworked, a user can easily separate the wrenchable structure 132 from the second panel 120 without applying too much strength.

Figure 8:
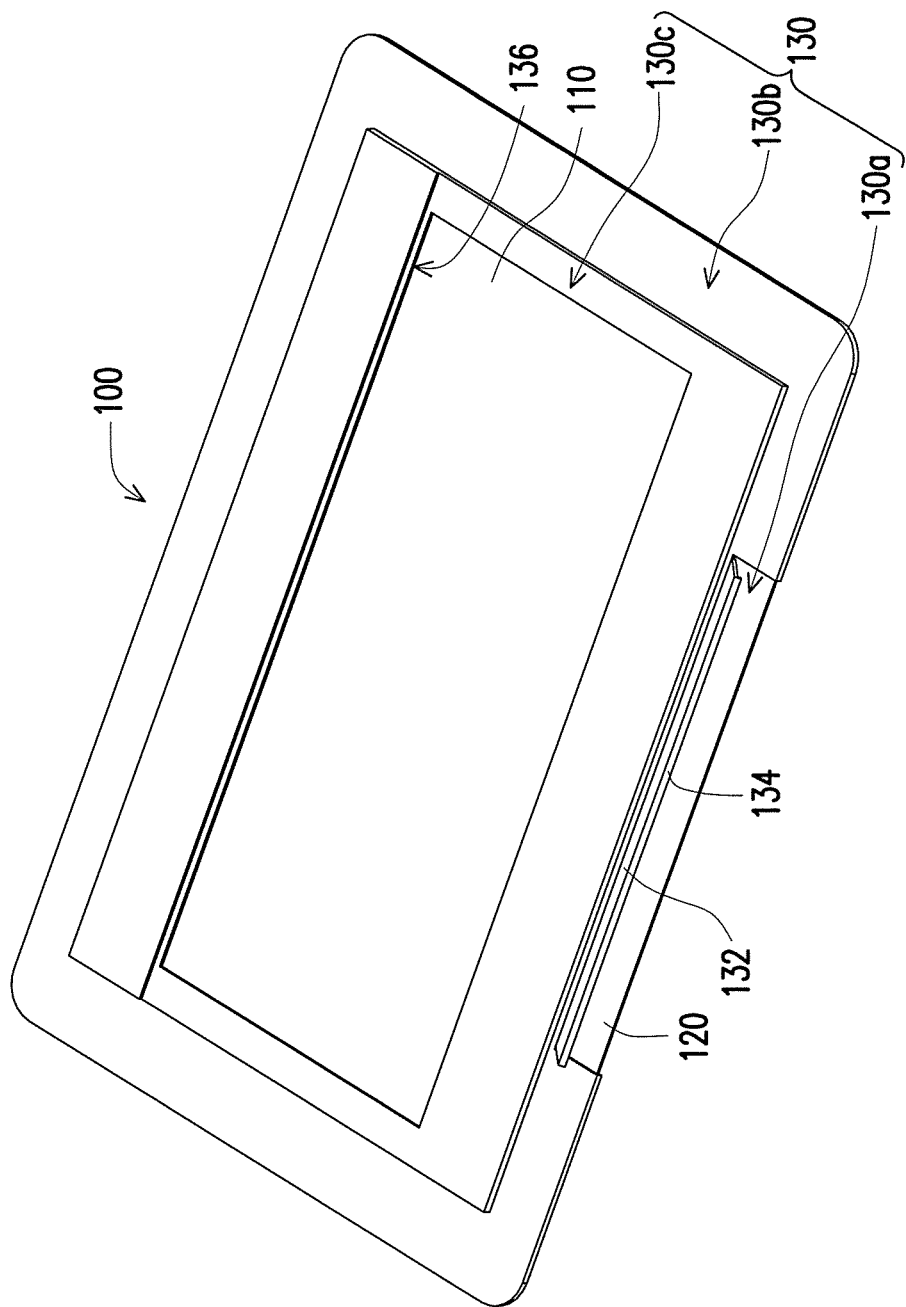
FIG. 8 is a diagram of a panel device according to a fourth embodiment of the present disclosure.

FIG. 8 is a diagram of a panel device according to a fourth embodiment of the present disclosure. Referring to FIG. 8, the main difference between the panel device 100 in FIG. 8 and the panel device 100 in FIG. 7 is that in FIG. 8, the wrenchable structure 132 covers the second panel 120 corresponding to the detachment area 132a. In other words, in the present embodiment, no adhesive is applied in the detachment area 132a, so that when the wrenchable structure 132 can be easily detached for it is not fastened by adhesive.

Figure 9:
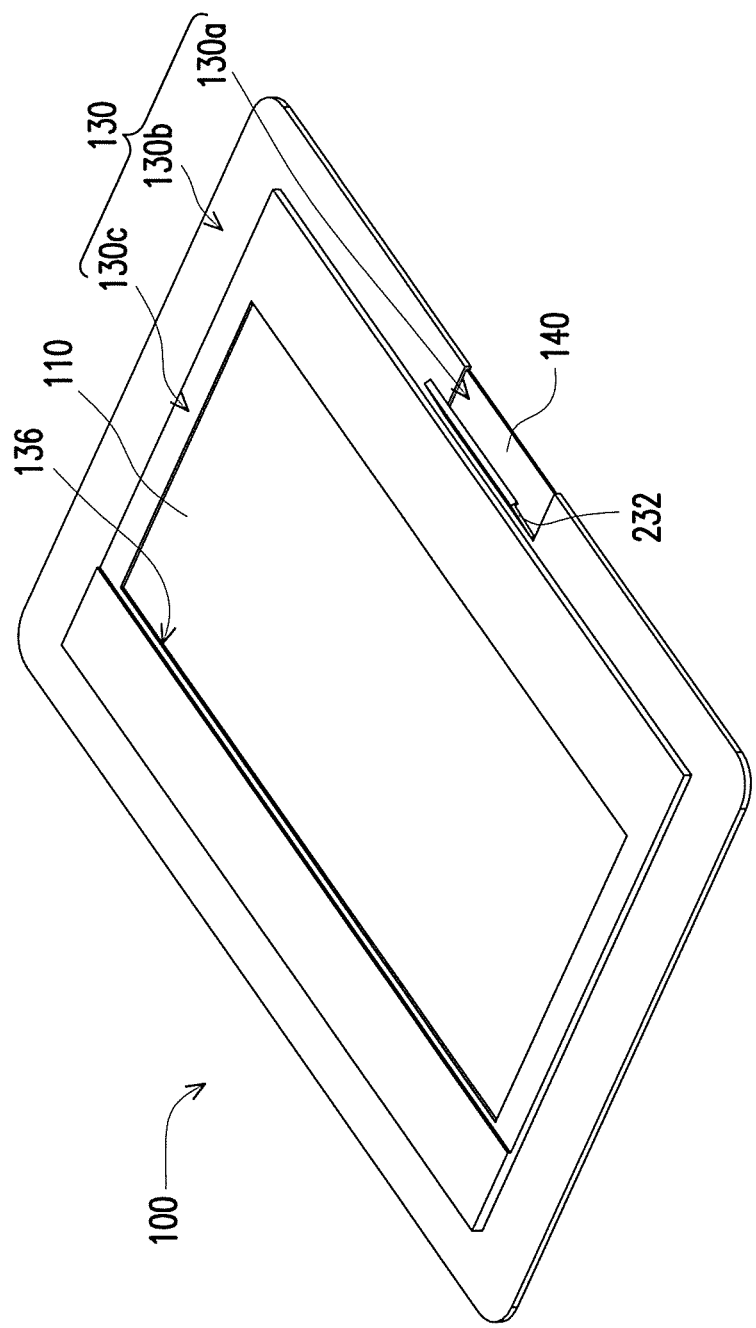
FIG. 9 is a diagram of a panel device according to a fifth embodiment of the present disclosure.

FIG. 9 is a diagram of a panel device according to a fifth embodiment of the present disclosure. Referring to FIG. 9, the main difference between the panel device 100 in FIG. 9 and the panel device 100 in the embodiments illustrated in FIGS. 1-8 is that in FIG. 9, the wrenchable structure 232 covers a smaller area therefore will not affect the overall appearance of the panel device 100. It should be noted that like the binder 140 in the embodiment illustrated in FIG. 4, the binder 140 in FIG. 9 is also adhered on the second panel 120 corresponding to the detachment area 130a. However, the present disclosure is not limited thereto. The binder may also be partially adhered to the second panel corresponding to the detachment area (as shown in FIG. 7), or there may even no adhesive in the detachment area (as shown in FIG. 8).

Figure 10:
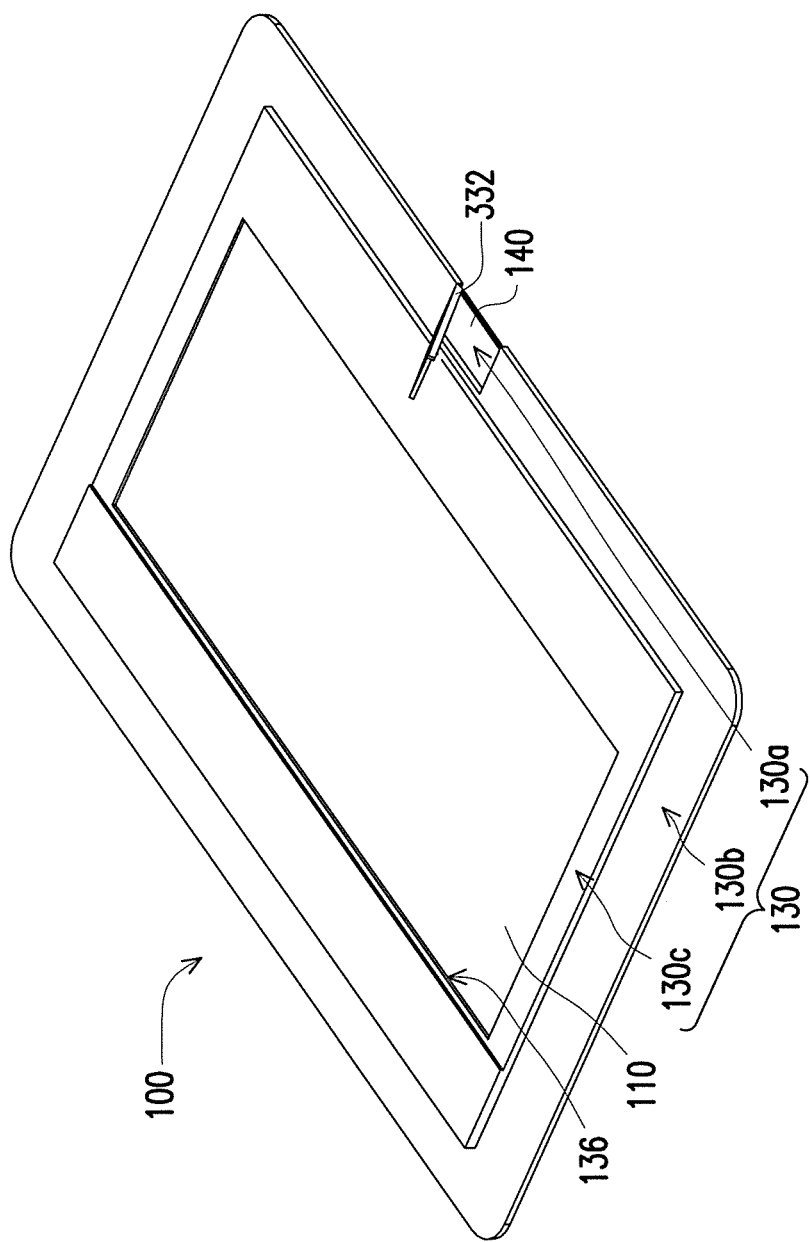
FIG. 10 is a diagram of a panel device according to a sixth embodiment of the present disclosure.

FIG. 10 is a diagram of a panel device according to a sixth embodiment of the present disclosure. Referring to FIG. 10, the main difference between the panel device 100 in FIG. 10m and the panel device 100 in each embodiment described above is that in FIG. 10, the direction for detaching the wrenchable structure 332 is different from that for detaching the wrenchable structures 132 in FIGS. 1-8 and the wrenchable structure 232 in FIG. 9. Namely, the direction for detaching the wrenchable structure is not limited in the present disclosure, and it is within the scope of the present disclosure as long as the wrenchable structure is separated from the second panel. However, a notch 132a same as those illustrated in FIGS. 1-9 can be formed at the bending portion of the wrenchable structure 332 in FIG. 10 in order to allow the second panel 120 to be easily detached from the frame 130. Moreover, the sides of the wrenchable structure 332 can be designed to have the partially disconnected structure (i.e., the first gaps 134a) illustrated in FIG. 3 or the second gaps 234a illustrated in FIG. 6 to allow the wrenchable structure 332 to be easily detached.

Figure 11:
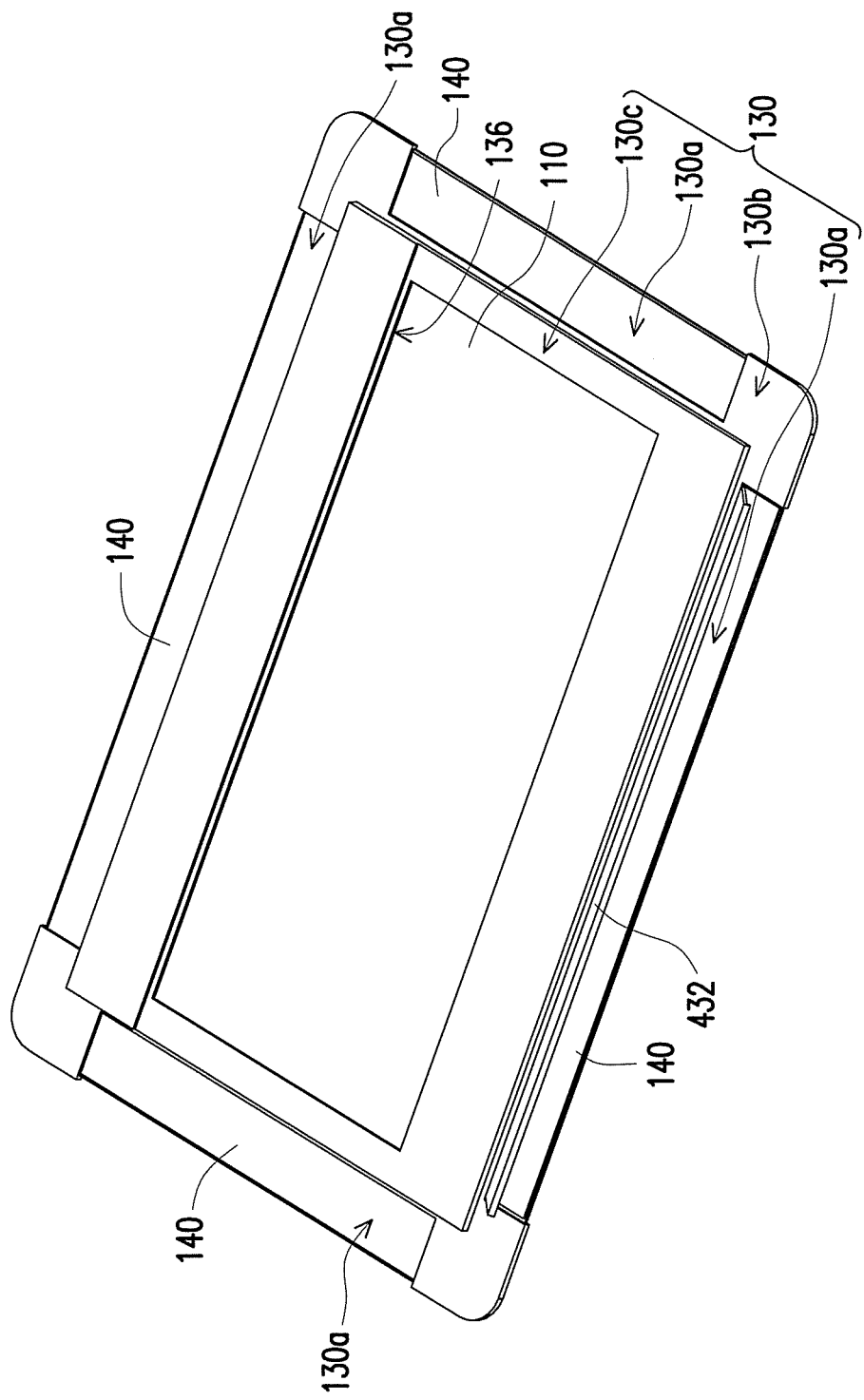
FIG. 11 is a diagram of a panel device according to a seventh embodiment of the present disclosure.

FIG. 11 is a diagram of a panel device according to a seventh embodiment of the present disclosure. Referring to FIG. 11, only one wrenchable structure 432 is illustrated for the convenience of description. The main difference between the panel device 100 in FIG. 11 and the panel device 100 in each embodiment described above is that in FIG. 11, the wrenchable structure 432 is located around the frame 130 to separate most area of the frame 130. Namely, in the present embodiment, the number and coverage of the detachment areas 130a are both large.

When the second panel 120 of the panel device 100 needs to be reworked, because the adhesion area 130b covers only a smaller area, most part of the frame 130 can be separated and accordingly most part of the second panel 120 can be exposed by simply separating the wrenchable structure 432 from the second panel 120. Thereby, a user can easily detach the second panel 120 from the frame 130, and the possibility of the second panel 120 being damaged due to improper user operations during the detachment and rework process can be reduced. It should be noted that in the present embodiment, the binder can be adhered on the second panel corresponding to the detachment area 130a (as shown in FIG. 3) or partially adhered on the second panel corresponding to the detachment area (as shown in FIG. 7), or no adhesive is disposed in the detachment area (as shown in FIG. 8).

Additionally, a notch 132a (as shown in FIGS. 1-9) can be formed at the bending portion of the wrenchable structure 432 in FIG. 11 in order to allow the second panel 120 to be easily detached from the frame 130. Moreover, a partially disconnected structure (i.e., the first gaps 134a) or the second gaps 234a as shown in FIG. 6 can be formed on the sides of the wrenchable structure 432 to allow the wrenchable structure 432 to be easily detached. However, the wrenchable structure 332 in FIG. 10 can be adopted to detach the wrenchable structure 432 from different directions.

As described above, in the present disclosure, a wrenchable structure is designed on a frame, and the wrenchable structure is wrenchably connected to a second panel. Accordingly, when the second panel of a panel device needs to be reworked, the wrenchable structure is first separated from the second panel to expose part of the second panel. Then, the frame is detached from the second panel, or the exposed part of the second panel and the binder are pushed away from the frame with a finger or any other suitable tool. Thereby, the relationship between the binder and the frame and the second panel can be easily released, so that the second panel can be easily detached from the frame, and the possibility of the second panel being damaged due to improper user operations during the detachment and rework process can be reduced.

Additionally, in the present disclosure, the wrenchable structure can be designed at different area and covering different range of the frame, and the binder can be designed to have different coverage, so that the design of the wrenchable structure of the panel device on the frame is made very flexible and can be adjusted or can perform other suitable design according to the actual product requirement.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A readily detachable panel device, comprising:
    a first panel;
    a second panel;
    a frame, having a wrenchable structure, wherein the first panel is between the second panel and the frame; and
    a binder, adhering the second panel to the frame, wherein the second panel is detachable from the frame through the wrenchable structure,
    wherein the frame has a first surface and a second surface opposite to each other, the wrenchable structure comprises a notch, and the notch is formed on the second surface of the frame and is not exposed on the first surface.

2. The panel device according to claim 1, wherein the wrenchable structure comprises a plurality of breakaway portions, and the breakaway portions run through the first surface and the second surface of the frame.

3. The panel device according to claim 2, wherein the frame has a plurality of sides, each of the sides has a first gap and a connecting portion corresponding to the breakaway portion, the first gaps connect the breakaway portions, and the connecting portions shield a part of the second panel.

4. The panel device according to claim 2, wherein the frame has a plurality of sides, each of the sides has a second gap corresponding to the breakaway portion, and each of the second gaps runs through the corresponding side and exposes a part of the second panel.

5. The panel device according to claim 3, wherein the frame is divided into a detachment area, an adhesion area, and a display area, the detachment area and the adhesion area are around the display area, the wrenchable structure is in the detachment area of the frame, the first panel is between the second panel and the display area of the frame, and the binder is between the adhesion area of the frame and the second panel for adhering the second panel to the frame.

6. The panel device according to claim 5, wherein the binder is adhered to the second panel corresponding to the detachment area and is covered by the wrenchable structure.

7. The panel device according to claim 5, wherein the binder is adhered to the second panel corresponding to the detachment area and exposes a part of the second panel, and the exposed part of the second panel and the binder are covered by the wrenchable structure.

8. The panel device according to claim 5, wherein the wrenchable structure covers the second panel corresponding to the detachment area.

9. The panel device according to claim 4, wherein the frame is divided into a detachment area, an adhesion area, and a display area, the detachment area and the adhesion area are around the display area, the wrenchable structure is in the detachment area of the frame, the first panel is between the second panel and the display area of the frame, and the binder is between the adhesion area of the frame and the second panel for adhering the second panel to the frame.

10. The panel device according to claim 9, wherein the binder is adhered to the second panel corresponding to the detachment area and is covered by the wrenchable structure.

11. The panel device according to claim 9, wherein the binder is adhered to the second panel corresponding to the detachment area and exposes a part of the second panel, and the exposed part of the second panel and the binder are covered by the wrenchable structure.

12. The panel device according to claim 9, wherein the wrenchable structure covers the second panel corresponding to the detachment area.

13. The panel device according to claim 2, wherein the frame is divided into a detachment area, an adhesion area, and a display area, the detachment area and the adhesion area are around the display area, the wrenchable structure is in the detachment area of the frame, the first panel is between the second panel and the display area of the frame, and the binder is between the adhesion area of the frame and the second panel for adhering the second panel to the frame.

14. The panel device according to claim 13, wherein the binder is adhered to the second panel corresponding to the detachment area and is covered by the wrenchable structure.

15. The panel device according to claim 13, wherein the binder is adhered to the second panel corresponding to the detachment area and exposes a part of the second panel, and the exposed part of the second panel and the binder are covered by the wrenchable structure.

16. The panel device according to claim 13, wherein the wrenchable structure covers the second panel corresponding to the detachment area.

17. The panel device according to claim 1, wherein the frame is divided into a detachment area, an adhesion area, and a display area, the detachment area and the adhesion area are around the display area, the wrenchable structure is in the detachment area of the frame, the first panel is between the second panel and the display area of the frame, and the binder is between the adhesion area of the frame and the second panel for adhering the second panel to the frame.

18. The panel device according to claim 17, wherein the binder is adhered to the second panel corresponding to the detachment area and is covered by the wrenchable structure.

19. The panel device according to claim 17, wherein the binder is adhered to the second panel corresponding to the detachment area and exposes a part of the second panel, and the exposed part of the second panel and the binder are covered by the wrenchable structure.

20. The panel device according to claim 17, wherein the wrenchable structure covers the second panel corresponding to the detachment area.

21. The panel device according to claim 1, wherein the first panel is a display panel.

22. The panel device according to claim 1, wherein the second panel is a touch panel.

* * * * *